(12) United States Patent
McConnell et al.

(10) Patent No.: US 6,882,850 B2
(45) Date of Patent: Apr. 19, 2005

(54) METHOD AND SYSTEM FOR ZONE-BASED CAPACITY CONTROL

(75) Inventors: Von K. McConnell, Leawood, KS (US); Mark L. Yarkosky, Overland Park, KS (US); Manish Mangal, Overland Park, KS (US); Thomas A. Crook, Lees Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 493 days.

(21) Appl. No.: 10/002,805

(22) Filed: Dec. 3, 2001

(65) Prior Publication Data

US 2003/0186702 A1 Oct. 2, 2003

(51) Int. Cl.⁷ ............................................. H04L 12/28
(52) U.S. Cl. .................... 455/453; 455/518; 455/422.1; 370/338; 370/352; 370/260
(58) Field of Search .......................... 255/453, 484, 255/418–419, 422.1, 455, 512, 514, 516, 518, 519; 370/312, 338, 349, 352, 389, 401, 328, 260

(56) References Cited

U.S. PATENT DOCUMENTS

| | | |
|---|---|---|
| 4,870,408 A | 9/1989 | Zdunek et al. |
| 5,179,374 A | 1/1993 | Winger |
| 5,371,780 A | 12/1994 | Amitay |
| 5,442,634 A | 8/1995 | Cizek |
| 5,442,809 A | 8/1995 | Diaz et al. |
| 5,500,889 A | 3/1996 | Baker et al. |
| 5,568,511 A | 10/1996 | Lampe |
| 5,570,411 A | 10/1996 | Sicher |
| 5,574,977 A | 11/1996 | Joseph et al. |
| 5,615,249 A | 3/1997 | Solondz |
| 5,710,591 A | 1/1998 | Bruno et al. |
| 5,752,193 A | 5/1998 | Scholefield et al. |
| 5,790,955 A * | 8/1998 | Tomoike ........................ 455/453 |
| 5,812,656 A | 9/1998 | Garland et al. |
| 5,818,836 A | 10/1998 | DuVal |
| 5,850,611 A | 12/1998 | Krebs |
| 5,884,196 A | 3/1999 | Lekven et al. |
| 5,936,964 A | 8/1999 | Valko et al. |
| 5,983,099 A | 11/1999 | Yao et al. |
| 6,014,556 A | 1/2000 | Bhatia et al. |
| 6,032,051 A | 2/2000 | Hall et al. |
| 6,061,559 A | 5/2000 | Eriksson et al. |
| 6,067,457 A | 5/2000 | Erickson et al. |

(Continued)

FOREIGN PATENT DOCUMENTS

| | | |
|---|---|---|
| EP | 0 817 457 | 1/1998 |
| EP | 0 984 608 | 3/2000 |

OTHER PUBLICATIONS

U.S. Appl. No. 10/116,456, filed Apr. 4, 2002, entitled "Method for Providing Differing service Levels in a Wireless Telecommunications Network" (Sprint Docket 1744).

Ericsson, www.telecomcorridor.com/wireless%20horizons/1Coyne.pdf, printed from the World Wide Web on Jun. 27, 2001.

International Search Report from International Application No. PCT/US02/31411, dated Mar. 4, 2003.

International Search Report from International Application No. PCT/US02/29575, dated Dec. 10, 2002.

(Continued)

(Continued)

Primary Examiner—David Hudspeth
Assistant Examiner—Kamran Afshar

(57) ABSTRACT

A mechanism is disclosed for controlling capacity in a communication system, based on zones in which subscribers are located. When a subscriber seeks to establish a communication session among multiple subscribers, a determination is made as to whether more than a threshold number of the subscribers are located in a common zone. If so, the excess subscribers in that zone are excluded from participating in the session.

32 Claims, 4 Drawing Sheets

U.S. PATENT DOCUMENTS

| | | | |
|---|---|---|---|
| 6,112,101 A | | 8/2000 | Bhatia et al. |
| 6,119,017 A | | 9/2000 | Cassidy et al. |
| 6,178,323 B1 | | 1/2001 | Nagata |
| 6,192,248 B1 | | 2/2001 | Solondz |
| 6,226,277 B1 | * | 5/2001 | Chuah ........................ 370/328 |
| 6,240,287 B1 | * | 5/2001 | Cheng et al. ................ 455/453 |
| 6,282,429 B1 | | 8/2001 | Baiyor et al. |
| 6,292,671 B1 | | 9/2001 | Mansour |
| 6,324,399 B1 | | 11/2001 | Salmivalli |
| 6,381,467 B1 | | 4/2002 | Hill et al. |
| 6,477,150 B1 | * | 11/2002 | Maggenti et al. ........... 370/312 |
| 6,490,452 B1 | | 12/2002 | Boscovic et al. |
| 6,526,377 B1 | | 2/2003 | Bubb |
| 6,618,597 B1 | * | 9/2003 | Choi .......................... 455/453 |
| 2002/0024943 A1 | * | 2/2002 | Karaul et al. ................ 370/338 |
| 2002/0055364 A1 | | 5/2002 | Wang et al. |
| 2002/0071445 A1 | | 6/2002 | Wu et al. |
| 2002/0107000 A1 | | 8/2002 | Goss et al. |
| 2002/0145990 A1 | | 10/2002 | Sayeedi |
| 2002/0147818 A1 | | 10/2002 | Wengrovitz |
| 2002/0172165 A1 | | 11/2002 | Rosen et al. |
| 2002/0172169 A1 | | 11/2002 | Rosen et al. |
| 2002/0173325 A1 | | 11/2002 | Rosen et al. |
| 2002/0173326 A1 | | 11/2002 | Rosen et al. |
| 2002/0173327 A1 | | 11/2002 | Rosen et al. |
| 2002/0177461 A1 | | 11/2002 | Rosen et al. |
| 2003/0008657 A1 | | 1/2003 | Rosen et al. |
| 2003/0021264 A1 | | 1/2003 | Zhakov et al. |
| 2003/0087653 A1 | * | 5/2003 | Leung et al. ................ 455/502 |
| 2003/0108000 A1 | * | 6/2003 | Chaney et al. .............. 370/338 |

OTHER PUBLICATIONS

International Search Report from International Application No. PCT/US02/36055, dated Apr. 10, 2003.

International Search Report from International Application No. PCT/US03/03021, dated Jun. 18, 2003.

U.S. Appl. No. 10/277,465, filed Oct. 22, 2002, entitled "Method for Call Setup Using Short Data Bursts" (Sprint Docket 1999).

3rd Generation Parntership Project 2 "3GPP2", Fast Call Set–Up, Version 1.0, Apr. 15, 2002.

Mobile Tornado, http://www.mobiletornado.com/products_iprsptt.html, printed from the World Wide Web on Jan. 27, 2003.

"Qualcomm Chats Up 'Push–to–Talk', " http://siliconvalley.internet.com/news/print.php/953261, printed from the World Wide Web on Jan. 27, 2003.

Schulzrinne and Rosenberg, "SIP Caller Preferences and Callee Capabilities," Internet Engineering Task Force, Internet Draft, Oct. 22, 1999.

Vakil et al., "Host Mobility Management Protocol Extending SIP to 3G–IP Networks," Internet Engineering Task Force, Internet Draft, Oct. 1999.

Cambell and Sparks, "Control of Service Context Using SIP Request—URI," Network Working Group, Apr. 2001.

Dirk Kutscher/Jorg Ott, "The Message Bus—A Communication & Integration Infrastructure for Component–Based Systems," White Paper, Jan. 2000.

Ott et al., "A Message Bus for Local Coordination," Network Working Group, Internet–Draft, May 30, 2001.

TR45, Medium Access Control (MAC) Standard for cdma2000 Spread Spectrum Systesm, IS–2000–3, Jul. 12, 1999.

3rd Generation Partnership Project 2 '3GPP2', "Interoperability Specification (IOS) for CDMA 2000 Access Network Interfaces—Part 3 Features ," Nov. 2001.

Perkins, "IP Mobility Support," Internet Eningeering Task Force Request for Comment 2002, Oct. 1996.

Perkins, "IP Encapsulation within IP," Internet Engineering Task Force Request for Comments 2003, Oct. 1996.

Perkins, "Minimal Encapsulation with in IP," Internet Engineering Task Force Request for Comments 2004, Oct. 1996.

Solomon, "Applicability Statement for IP Mobility Support," Internet Engineering Task Force Request for Comments 2005, Oct. 1996.

Handley et al., "SDP: Session Description Protocol," Internet Engineering Task Force Request for Comment 2327, Apr. 1998.

Handley et al., "SIP: Session Initiation Protocol," Internet Engineering Task Force Request for Comment 2543, Mar. 1999.

Fielding et al., "Hypertext Transfer Protocol—HTTP/1.1," Internet Engineering Task force Request for Comment 2616, Jun. 1999.

Rigney et al., "Remote Authetication Dial in User Service (RADIUS)," Internet Engineering Task Force Request for Comment 2865, Jun. 2000.

Rigney, "RADIUS Accounting," Internet Engineering Task Force Request for Comment 2866, Jun. 2000.

Oma, Discussion and definitions on PoC Floor Control, Input Contribution, Doc #OMA–REQ–2003–0375–PoC_Floor_Control, Jun. 2, 2003.

Oma, "PoC Use case: Mobile—PC Example, " Input Contribution, Doc #OMA–REQ–2003–0323 PoC Mobile–PC use case, May 5, 2003.

Oma, "PoC Use case: Multimedia Group Call Example," Input Contribution, Doc #OMA–REQ–2003–0306–PoC Use Case–group–multimedia–scenario, May 6, 2003.

Oma, "PoC Use case: Examples of User Requirements," Input Contribution, Doc #OMA–REQ–2003–03050PoC Use Case, May 6, 2003.

Oma, "Inputs for PoC Requirements Document," Input Contribution, Doc #OMA–REQ–2003–0367–PoC_Input_Motorola, May 29, 2003.

Oma, "Push to Talk over Cellular (PoC)," Version: 0.1.6, May 12, 2003.

* cited by examiner

METHOD AND SYSTEM FOR ZONE-BASED CAPACITY CONTROL

BACKGROUND

1. Field of the Invention

The present invention relates to telecommunications and more particularly to a method and system for managing capacity in a communication system. The techniques described here can extend to use with respect to various types of communication sessions, whether circuit-switched or packet-switched, and whether the participants are coupled wirelessly or by hardware (e.g., wire, fiber, etc.) to the communication system.

2. Description of Related Art

As a general matter, it is known to establish a conference session over a telecommunications network between multiple user stations, each operated by a respective user. An multipoint control unit (MCU) or other such entity can reside in the telecommunications network and can function as a bridging or switching device between the participating stations, to support the conference session.

In a typical arrangement, a participating station can initiate the conference session by sending a session setup message to the MCU (or to another entity, such as a proxy, that then forwards the message to the MCU), identifying the other desired participant(s). The MCU may then seek to connect with the designated other participants, such as by forwarding the session setup message to each other party. Upon successful setup of the session, the MCU may then establish a communication session respectively with each participating station, and the MCU may bridge together the communication sessions, so that the users at the stations can confer with each other via the MCU. Other arrangements are also possible.

By way of example, consider two users, A and B, operating respective user stations. User A wishes to engage in a conference session with user B and therefore instructs his user station to initiate the conference. A's user station may then responsively execute a session initiation protocol (SIP) client application to generate and send a SIP INVITE message to the MCU, seeking to invite B to the conference session. The MCU will then treat that INVITE message as a request to establish a conference session with B. To establish the conference session, the MCU may send another INVITE to B's station, seeking to set up a session with B.

Upon receipt of the INVITE from the MCU, B's station may execute a SIP client application to accept the invitation, by sending a SIP 200 OKAY message back to the MCU. Upon receipt of the 200 OKAY, the MCU would then send a 200 OKAY to A's station. In turn, A's station would send a SIP ACKNOWLEDGEMENT to the MCU, and the MCU would send an ACKNOWLEDGEMENT to B's station. As a result, two communication sessions or "legs" will have been initiated, one between A's station and the MCU, and another between the MCU and B's station.

Once these legs have been initiated, the two stations may then work to establish a real time protocol (RTP) sessions with the MCU. For instance, a real-time-control-protocol (RTCP) client in A's station may generate and send an RTCP initiation message to the MCU, and the MCU may send an RTCP initiation message to an RTCP client in B's station. The RTCP client in B's station may then send an accept-message back to the MCU, and the MCU may send an accept message back to the RTCP client in A's station. As a result, an RTP session would be established between A's station and the MCU, and another RTP session would be established between the MCU and B's station. And the MCU would bridge together the two sessions, thereby allowing A and B to communicate with each other.

SUMMARY

The present invention provides a mechanism for controlling capacity in a communication system. According to an exemplary embodiment of the invention, limitations can be placed on the number of users that can engage in a communication session with each other concurrently in a common location (e.g., a geographic zone, a cell, a sector of a cell, etc.)

As an example, for a given geographic zone, a threshold of T users might exist. When an effort is made to bridge together more than T users who are operating in that geographic zone (possibly together with users in other zones as well), only T of the users in the geographic zone would be allowed to participate in the session. Other users in the common location would be barred from participating in the session.

When presented with a request to establish a communication session between more than the allowed threshold number of users in a given location, a carrier or other entity could select excess users to exclude from the session and can then exclude those excess users from the session. The choice of which user(s) to exclude could be based on priority levels that have been set in advance for the various users. For instance, a user with a lower priority level could be excluded before a user with a higher priority level. Alternatively, the choice of which user(s) to exclude could be designated by the user who initiated the communication session in the first place. Still alternatively, the choice of which users to exclude could be made randomly or in any other manner desired.

Further, the capacity threshold can be fixed for all locations or can vary from location to location. For instance, in a geographic zone that is known to have a very high level of traffic, the threshold might be set to a low level, so as to avoid having many users in the location bog down the system by communicating with each other. Examples of such a location might be a construction site, a busy intersection, or a sports stadium. On the other hand, in a zone that is known to have a very low level of traffic, the threshold might be set to a high level, allowing many users at once to communicate with each other. An example of such a location might be a farm or other rural area.

Additionally, the thresholds per location could vary from time to time. For example, when a given location tends to be more loaded with traffic (e.g., during rush hour or on weekdays), the threshold might be set lower. On the other hand, when a given location tends to be less loaded with traffic (e.g., on weekends), the threshold might be set higher. (Note that the converse might be desired instead; i.e., when the location is more loaded with traffic, the threshold might be set higher.) A dynamic threshold controller could be applied to monitor traffic levels over time and to modify the threshold per location based on such historic trends and/or based on other criteria.

With the benefit of the present invention, a communications provider (e.g., a wireless service carrier) can help to avoid situations where a network could be bogged down by excess traffic due to multi-party communication sessions. For example, in a given sector of a cellular communications network, a large construction project might be underway. If too many construction workers in the sector seek to communicate with each other at once, system resources (e.g., traffic channels) in that sector may well be depleted. As a result, another subscriber not associated with the construction site may be precluded from accessing the system in that sector. Provided with the present invention, this situation can be avoided.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
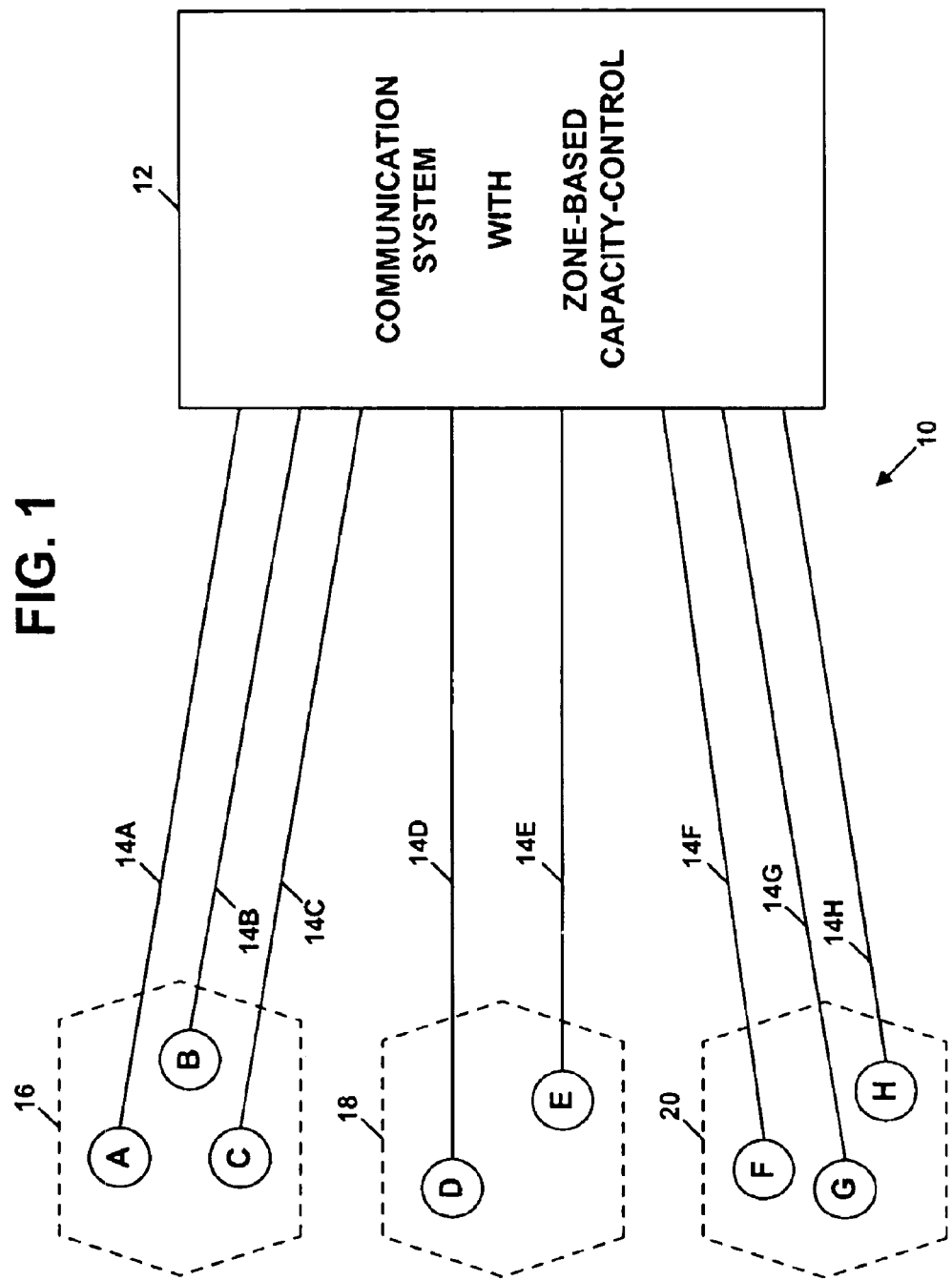
FIG. 1 is a block diagram of a network arranged in accordance with the exemplary embodiment.

Referring to the drawings, FIG. 1 is a block diagram generally depicting a communications network 10 arranged in accordance with an exemplary embodiment of the invention. Network 10 includes at its core a communication system 12, which provides for zone-based capacity control. A plurality of subscriber terminals may then be coupled by respective communication links 14A–14H with system 12. By way of example, eight such terminals are shown, designated respectively by the letters A–H.

FIG. 1 further depicts three geographic zones, designated by reference numerals 16, 18 and 20. Terminals A–C are shown located in (e.g., operating in) zone 16, terminals D–E are shown located in zone 18, and terminals F–H are shown located in zone 20. Although these zones are illustrated as discrete (non-overlapping) areas, they could just as well overlap each other or, for that matter, be coterminous.

Each zone could be defined in various ways. For example, a zone could be a particular geographic area, defined as a polygon comprised of nodes having specific geographic coordinates (latitude/longitude coordinates). As another example, a zone could be a particular enclosure such as a building or floor of a building, defined by the walls of the enclosure. As yet another example, a zone could be serving area in a wireless communication system, such a radio-frequency cell or sector thereof, defined by a radiation pattern from a base station antenna. And as still another example, a zone could be a given network, sub-network or serving system, which could cover all subscriber terminals currently operating in the network, sub-network or serving system. Other examples are possible as well.

Terminals A–H can also take any of a variety of forms and can be the same as each other or different than each other. Examples of suitable terminals include cellular or PCS telephones, landline telephones, personal digital assistants (PDAs) and personal computers. Other examples are possible as well.

Links 14A–14H, similarly, can take any of a variety of forms and can also be the same as or different than each other. Further, each link could comprise various elements, such as wired or wireless connections, direct end-to-end connections, and one or more transport networks, whether packet-switched or circuit-switched, and each link could operate according to any of a variety of protocols. Additionally, some or all of the links could be combined together at least in part. For instance, links 14A and 14B might be physically connected through a common access network/gateway and via a common transport network to communication server 12. Many other examples are also possible.

Communication system 12, in turn, can also take a variety of forms. As a general matter, communication system 12 functions to tie together communications among two or more of the subscriber terminals while controlling the number of terminals that can concurrently communicate with each other in a given zone. These functions can be carried out by a single entity or can be distributed among a number of different entities.

For example, communication system 12 can take the form of an MCU that operates, as described above in the background section, to establish and bridge together communication legs with each terminal participating in a session. The MCU can then include a set of capacity-control logic that provides for restricting the number of participants who can be engaged in a communication session together in a common zone. As such, the MCU might include or have access to location information indicating the zone in which each terminal is located (e.g., operating), as well as threshold information indicating a general threshold or a threshold per zone.

As another example, communication system 12 can be a multi-component system. For instance, it could include a sub-system for setting up a multi-party communication session (e.g., conveying and handling control signals to set up and tear down sessions). Further, it could include a sub-system for serving a multi-party communication session (e.g., a conference bridge or conference server for tying together multiple communication legs), a location sub-system for determining locations of subscribers, and a database sub-system maintaining capacity-threshold information and other information.

Figure 2:
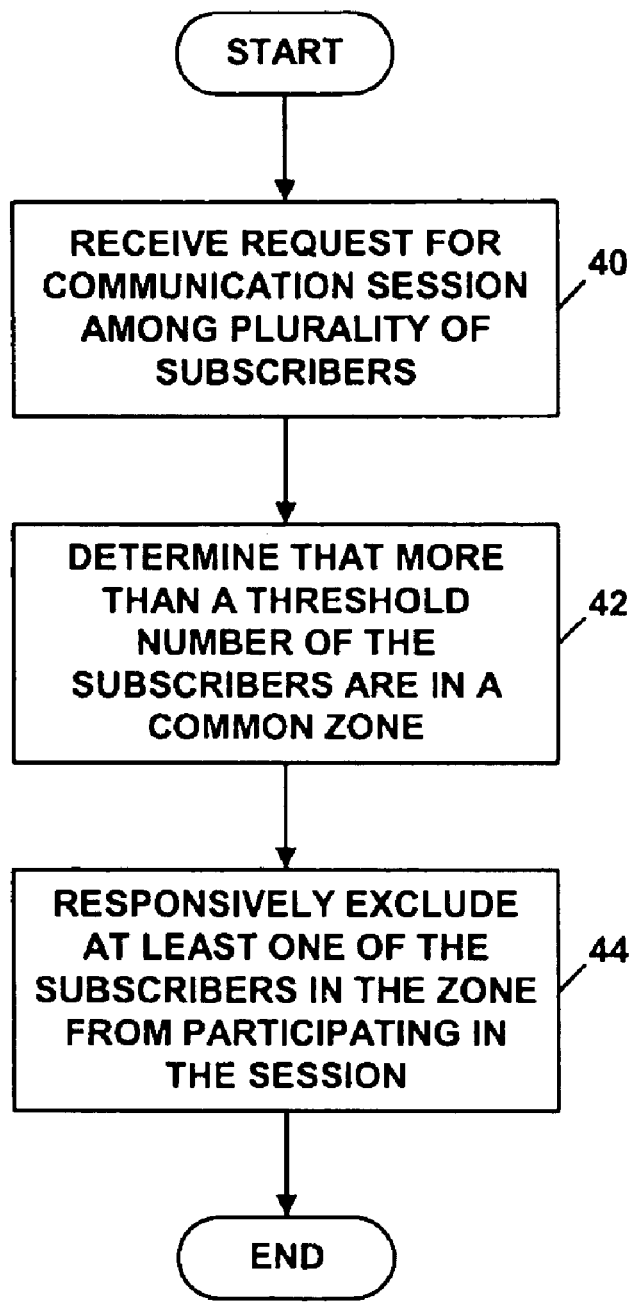
FIG. 2 is a flow chart depicting a set of functions that can be employed in the network shown in FIG. 1.

Referring now to FIG. 2, a flow chart is provided to illustrate a set of functions that could be employed within the arrangement shown in FIG. 1. As shown in FIG. 2, at block 40, communication system 12 receives a request to establish a communication session between a plurality of subscribers. At block 42, communication system 12 responsively makes a determination that more than a threshold number of the subscribers are located in (e.g., operating in) a common zone. In turn, at block 44, in response to the determination, the communication system 12 bars at least one of the subscribers located in the zone from participating in the session.

Preferably, the number of subscribers in the zone that the communication system 12 bars from participating in the session is the number in excess of the threshold. Thus, for instance, assume that a zone has a threshold of seven subscribers, and assume that the communication system 12 receives a request to establish a communication session among ten subscribers all located in that zone (and possibly among subscribers located in one or more other zones as well). According to the method illustrated in FIG. 2, the communication system would bar at least one, but preferably three, of the ten subscribers located in the zone from participating in the session. (If the communication system bars only one, still two excess participants would be allowed; while this is not preferred, it is possible.)

As another example, referring to FIG. 1, assume that zones 16, 18 and 20 each have a threshold of two subscribers to engage in a communication session with each other. Assume next that system 12 receives a request to establish a communication session between the group of subscribers A–H. Because three of the subscribers are located in zone 16, system 12 would determine that one more than the allowed threshold number of subscribers is located in zone 16. Therefore, system 12 would exclude one of subscribers A, B and C from participating in the session. Additionally, because three of the subscribers are located in zone 20, system 12 would determine that one more than the allowed threshold number of subscribers is located in zone 20. Therefore, system 12 would exclude one of subscribers F, G and H from participating in the session. Finally, because only two of the subscribers are located in zone 18, system 12 would allow both of those subscribers to participate in the session.

Figure 3:
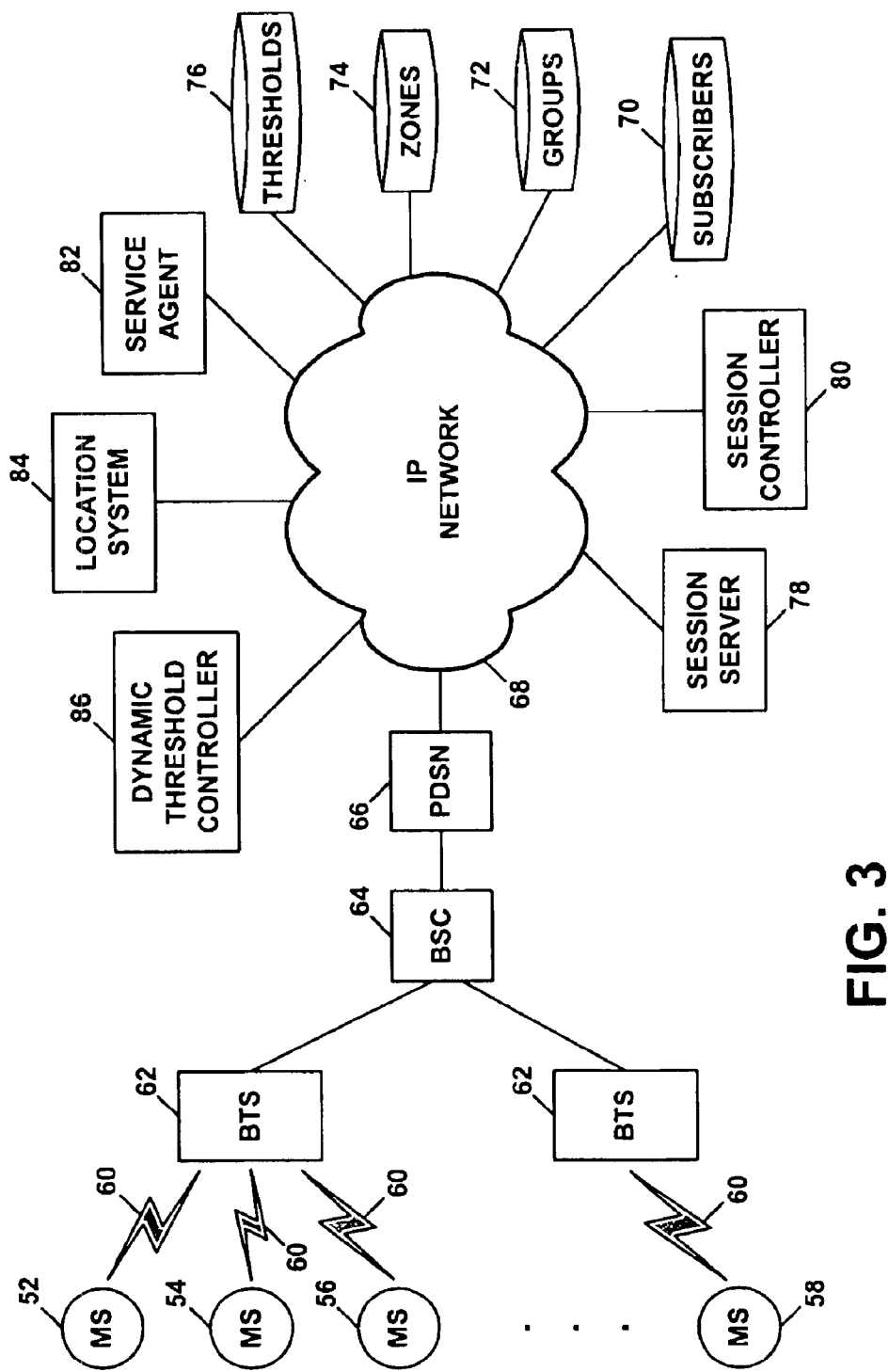
FIG. 3 is a more detailed block diagram of a network arranged in accordance with the exemplary embodiment.

The arrangement shown in FIG. 1 is representative of many possible communication networks. Referring now to FIG. 3, an example of one such communication network is shown in more detail. The network shown in FIG. 3 includes a plurality of subscriber terminals, of which four are shown, as designated by reference numerals 52, 54, 56 and 58. In this example, each subscriber terminal is a 3G mobile station (MS), such as a handheld PCS or cellular communication station, which is capable of engaging in IP communications such as voice over IP for instance. Each MS communicates via an air interface 60 with a base transceiver station (BTS) 62, which provides connectivity to a base station controller (BSC) 64. The BSC in turn provides connectivity with a packet data serving node (PDSN) 66, which functions as a gateway to a public or private IP network 68 such as the Internet.

FIG. 3 depicts a plurality of entities connected with or sitting as nodes on IP network 68. It should be understood that each of these entities represents a function within the exemplary network. As such, the entities could take various forms and could be combined together or distributed in various ways (e.g., made up of a number of components) as desired. Further, some of the entities could be omitted, and others could be added. Still further, any of these or other entities that are described herein as carrying out a particular function could include a processor and data storage holding an appropriate set of program instructions (e.g., machine language instructions) executable by the processor to carry out that function. Alternatively or additionally, such entities could include hardware and/or firmware for carrying out various functions described. Still further, it should be understood that some or all of the entities shown on network 68 could instead be on discrete networks or arranged in other locations.

Four of the entities shown on IP network 68 are data stores. These are a subscriber data store 70, a group data store 72, a zone data store 74, and a threshold data store 76. These data stores could all be combined into a single data store or could be distributed and/or integrated into one or more other entities, whether or not shown. Each data store can also take various forms. For instance, a data store could be a list or table of data or a more complex relational database or directory structure, stored in a data storage medium such as computer memory or magnetic or optical disk drive.

The subscriber data store 70 preferably indicates information about subscribers, such as mobile stations 52–58 and/or users associated with the stations. According to the exemplary embodiment, the subscriber data store can define, respectively for each subscriber, (i) a subscriber ID and (ii) a priority level, as well as other service qualification information. The subscriber ID can take various forms. For instance, it could be a device ID such as a mobile identification number (MIN) and/or a user ID such as a network address identifier (NAI). The priority level can be an indication of a class or level of service to which the subscriber is entitled, as established in advance through a service-provisioning system for instance. As will be discussed more below, the priority level can be used as a basis to determine whether the subscriber should be excluded from a communication session where more than an allowed threshold of session participants are located in a common zone.

The group data store 72 preferably indicates predefined groups of subscribers who will communicate with each other. According to the exemplary embodiment, these groups can be defined in advance (again, through a suitable provisioning system) and can be used as a basis to determine which subscribers to bridge together in response to a group-communication request (group session initiation request) from a given subscriber. As such, the group data store 72 may indicate, respectively for each given subscriber, a group that includes the given subscriber and one or more other subscribers. Alternatively or additionally, the group data store may limit each subscriber to be in a single group. Other arrangements are also possible.

The zone data store 74 preferably defines zones, such as zones 16, 18 and 20 of FIG. 1. Because a zone can be defined in various ways, the information contained in the zone data store 74, may take various forms as well. As an example, if zones are defined as cells or sectors of a wireless communication system, the zone data store might list the available cells and sectors. As another example, if zones are defined as geographic locations (e.g., bounded by particular geographic coordinates), the zone data store might correlate particular geographic coordinates to a given zone. And as still another example, if zones are defined as particular networks on which subscriber terminals can operate, the zone data store might list the possible network domains.

The threshold data store 76, in turn, indicates one or more thresholds that represent a maximum number of subscribers allowed to communicate with each other in a common zone. The threshold data store can specify a single threshold level can exist for all zones (i.e., the same threshold for every zone) or multiple thresholds for various zones. Further, the threshold data store could indicate differing thresholds for one or more zones depending on the date or time or any other criteria. In the exemplary embodiment, each zone will have its own respective threshold. Therefore, the threshold data store 76 will indicate, for each zone, a respective threshold number of subscribers allowed to engage in a communication session together within the zone.

Also shown on IP network 68 is a session server 78. The session server 78 functions to bridge together communications among a plurality of subscribers. Thus, the session server 78 might be an MCU such as that described in the background section above. As such, the session server might include a number of ports (physical or logical) through which the session server can establish respective communication legs with a plurality of subscribers. And the session server 78 might include a processor or other logic for tying together those communication legs, so as to establish a multi-party communication session.

Another entity on network 68 is a session controller 80. In accordance with the exemplary embodiment, the session controller 80 functions to determine which subscribers are to be bridged together in a given situation.

For example, the session controller could receive from a given subscriber terminal, such as MS 52, a request to establish a group-communication session, and the request might not define which subscribers are members of the group. The request may, for instance, be a SIP INVITE request message, including a predefined "group session" flag. In response to the request, the session controller 80 may query the group data store 72 to find out which group of subscribers is predefined for MS 52. Given the list of subscribers in the group, the session controller 80 may then instruct the session server 78 to establish and bridge together communication legs with each of those subscribers. For instance, the session controller could send separate SIP INVITE requests for each subscriber along to the session server.

As another example, when MS 52 requests a communication session to be established among a group of subscribers, MS 52 itself might send separate SIP INVITE requests for each proposed participant or might send a SIP INVITE that identifies all of the requested participants. Alternatively, some other entity along the signaling path might divide a group-communication request fro MS 52 into a number of separate SIP INVITES. Session controller 80 may then receive the INVITES and forward them as a proxy server on to session server 78. Other arrangements and messaging schemes are also possible.

Yet another entity on network 68 is a service agent 82. According to the exemplary embodiment, the service agent functions as a general resource or aid for providing services, i.e., as a policy decision point. As such, it may receive a signaling message indicative of a communication (e.g., a communication attempt, or an ongoing communication session) and may responsively derive or identify a service treatment for that communication. It may then signal to a policy enforcement point, to facilitate carrying out the service treatment. Or it may itself enforce the service.

As an example, when session server 80 is going to pass a packet of data between MS 52 and MS 54, the session server might signal up to the service agent 82. The service agent might then determine based on a query to the subscriber data store 70 (perhaps referencing service qualification information for MS 52 and/or MS 54), that the packet should not be passed. Consequently, the service agent may instruct the session server to block the packet. Other examples are possible as well.

In this regard or more generally, the service agent may also embody a session signaling proxy, such as a SIP proxy application. As such, when a mobile station such as MS 52 sends a SIP INVITE or other such message to session controller 80 or session server 78, the message could pass through service agent 82. On the way through service agent 82, the service agent itself could operate on the message in some manner. For instance, the service agent could change a group-communication request to reflect a request for communication among particular subscribers. And the service agent could then forward that more particular request along to one or more other entities for further processing.

Another entity on network 68 is a location system 76. In the exemplary embodiment, the location system functions to determine and/or report the location of subscriber terminals, such as mobile stations 52–58. As such, the location system could take a variety of forms. For example, the location system could comprise a mobile positioning center (MPC) and position determining entity (PDE) as defined by industry standard IS-801, promulgated by the Telecommunications Industry Association/Electronics Industry Association.

The MPC can generally be a database application executed on a service control point and can function to store locations of mobile stations. The PDE, in turn, can be any system for determining the location of mobile stations. As an example, the PDE might be a network-based location-determination system, such as a home location register (HLR) that maintains a record of the cell and sector in which each mobile station is operating, or a triangularization system that determines where a mobile station is located based on a comparison of relative signal strength from several measuring points. Alternatively or additionally, the PDE might be a handset-based (or, more generally, subscriber based) position determining system, such as a GPS receiver in a mobile station, as well as functionality to communicate that location information from the mobile station to the network. Many other examples are also possible.

In the exemplary embodiment, the MPC would then maintain a record of the location of each subscriber terminal, as determined by the PDE. In turn, one or more other entities on network 68 could query the MPC to determine the location of a given subscriber terminal, and the MPC can report the requested location. In the exemplary embodiment, the location reported by the MPC could be an indication of which zone the subscriber terminal is located in at the moment (or as last determined). In this regard, the location itself might be the zone (such as if the location is a cell and/or sector for instance). Alternatively, the MPC or other entity (e.g., the querying entity) could translate the location information provided by the MPC into a zone.

In accordance with the exemplary embodiment, a dynamic threshold controller 86 is also provided on IP network 68. The dynamic threshold controller preferably functions to manage the thresholds indicated in threshold data store 76, possibly establishing and/or changing those thresholds based on various criteria. The dynamic threshold controller may, for instance, modify the threshold for a given zone based on a statistical analysis of history of traffic in the zone, or based on current load conditions in the zone. As such, the dynamic threshold controller 86 may write new or revised thresholds to the threshold data store 76 and/or change the relationship between thresholds and zones in the threshold data store 76.

For example, the dynamic threshold controller may refer to history records regarding the load per time of day in each zone. (The controller itself, and/or each BTS 62, BSC 64, PDSN 66 or other entity could programmed to compile these statistics over time.) By reference to those records (through regular polling, for instance), the dynamic threshold controller might determine that the highest traffic load in a given zone occurs 8:00 a.m. to 10:00 a.m. every weekday. In response, the dynamic threshold controller may lower the threshold in that zone during that period each weekday, and may increase it (or restore it to a default level) at other times. Other examples are possible as well.

Figure 4:
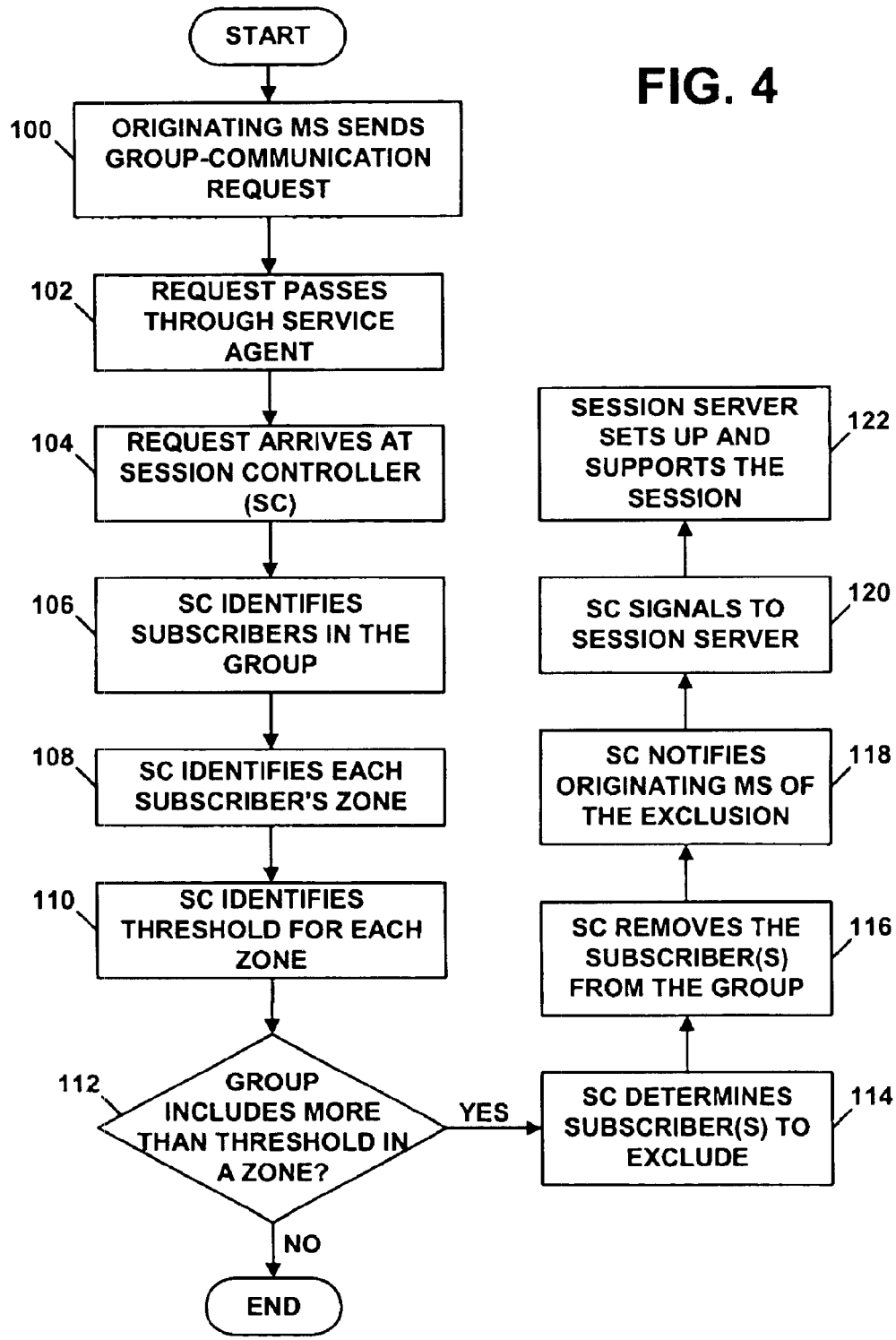
FIG. 4 is a flow chart depicting a set of functions that can be employed in the network shown in FIG. 3.

Referring now to FIG. 4, a more detailed flow chart is provided, to illustrate how the exemplary embodiment might function in the arrangement shown in FIG. 3. As shown in FIG. 4, at block 100, assume MS 52 sends a group-communication request in the form of a SIP INVITE request that identifies the originating subscriber (MS 52 and/or the user) and includes a group-communication flag. (A user operating MS 52 may, for instance, direct MS 52 to initiate this session. MS 52 may be programmed with a SIP client and may respond to the user direction by sending the SIP INVITE). At block 102, the SIP INVITE may pass through a SIP proxy on service agent 82. And at block 104, the SIP INVITE request may arrive at session controller 80.

At block 106, session controller 80 may respond to the group-communication request from MS 52 by querying group data store 72 to determine which subscribers are in a predefined group associated with MS 52. Assume for purposes of this example that the group is a group of ten subscribers, including mobile stations 52–58.

At block 108, the session controller then queries location system 84 to identify, respectively for each subscriber in the group, the zone in which the subscriber is located (or was located as last determined). Assume for purposes of this example that location system 84 responsively reports that, of the ten subscribers, eight subscribers (including MS 52, MS 54 and MS 56) are located in zone 16 and two subscribers (including MS 58) are located in zone 18.

At block 110, the session controller then queries threshold data store 76 to determine the threshold for each applicable zone, i.e., for each zone in which any subscriber in the group is located. Thus, continuing with this example, assume that the session controller identifies a threshold of six subscribers for zone 16 and three subscribers for zone 18.

At block 112, the session controller then determines, for each zone identified at block 108, whether more than a threshold number of subscribers in the group is located in the zone. Thus, for instance, for zone 16, the session controller would determine whether more than six subscribers in the group are located in zone 16. And, for zone 18, the session controller would determine whether more than three subscribers in the group are located in zone 18. Since eight of the subscribers in the group are located in zone 16, and since the threshold for zone 16 is six subscribers, the session controller would thus determine that more than a threshold number of subscribers in the group are located in zone 16. (The threshold of three subscribers for zone 18 would not be met, since only two subscribers in the group are located in zone 18.)

In accordance with the exemplary embodiment, the session controller then bars at least one of the subscribers located in zone 16 from participating in the session. In other words, the session controller literally or effectively removes at least one such subscriber from the group, thereby truncating the group. As noted above, in the exemplary embodiment, the number of subscribers that will be barred from participating will be the number in excess of the threshold. Thus, in this example, the session controller will bar two subscribers in zone 16 from participating in the requested session.

At issue, however, is which two subscribers to exclude from the communication session. This can be resolved in various ways. One way to do so is to refer to the priority levels set forth in the subscriber data store 70 and to bar the two subscribers that have the lowest priority levels (and, in the case of a tie, to randomly or otherwise select subscriber (s) to bar). Thus, as shown at block 114 in FIG. 4, session controller 80 queries subscriber data store 70 to determine, respectively for each subscriber (of the group) that is located in zone 16, the subscriber's priority level. Assume that the session controller thereby determines that MS 54 and MS 56 have the lowest priority levels of the six subscribers in zone 16. At block 116, the session controller thus removes MS 54 and MS 56 from the group of subscribers to be bridged together. The group will therefore consist of MS 52, MS 58, five other subscribers in zone 16, and one other subscriber in zone 18.

Another way to determine which subscriber(s) to exclude from the session is to ask the originating subscriber. For instance, session controller 80 may send a signaling message to MS 52, indicating that too many subscribers of the group are located in a common zone (zone 16). The message could present MS 52 with a list of the subscribers in that zone and prompt MS 52 to select two of the subscribers to exclude from the session. The user of MS 52 may then select two subscribers to exclude and instruct MS 52 to report that selection to the session controller.

This bi-directional messaging between the session controller and MS 52 can be carried out in various ways. For example, if MS 52 had initiated the group-communication request through interaction with an web server or application server on IP network 68, session controller 80 could instruct that web server or application server to send a message in the form of a web page (e.g., HTML or HDML) to the subscriber. As another example, session controller 80 could itself send a message such as an HTTP, e-mail or short message service (SMS) message to MS 52 and await a response. Other examples are possible as well.

Even if the session controller does not prompt the subscriber to indicate which subscribers to exclude, at block 118, the session controller may send a message to the subscriber indicating that one or more subscribers have been excluded and identifying the subscriber(s). Thus, continuing with the example, the session controller would notify MS 52 that subscribers MS 54 and MS 56 have been excluded from the communication session. This messaging can be carried out in the manner described above or in any other manner desired.

At this point, the session controller has a list of subscribers to be tied together in a communication session. At block 120, the session controller then signals to session server 78, seeking to set up the communication session. At block 122, session server 78 then sets up and supports the communication session among the eight subscribers of the group.

While the process shown in FIG. 4 provides for the session controller 80 to carry out zone-based capacity control and associated messaging, note that one or more other entities could carry out the function instead (or in addition). Preferably, any such entity would be an entity along the session-control signaling path. For instance, in the example described, a SIP INVITE request passes through service agent 82 on its way to session controller 80. Therefore, service agent 82 can just as well perform the zone-based capacity control function. Similarly, the session server 78 itself could perform these functions. Other examples are also possible.

The process described thus far also involves controlling capacity upon the initiation of a communication session. The process may be extended, however, to provide capacity control during an ongoing session as well. To do so, an entity should maintain a record indicating the state of the communication session, such as an indication of which subscribers are currently engaged in the communication session. By way of example, that entity could be session controller 80, service agent 82, session server 78, or any other entity in the signaling path.

Thus, assume for example that a subscriber in zone 16 has been excluded from a communication session in the manner described above. Assume next that that another subscriber in zone 16 leaves the session, so that the subscriber sends a SIP BYE message, which passes to session controller 80. When session controller 80 receives that message, it may forward it to session server 78, to effect the removal of the subscriber from the session. In addition, however, the session controller can determine that the excluded subscriber can now be added back into the session. Thus, the session controller may send a SIP INVITE to the session server, to effect an addition to the session of the previously excluded subscriber. This process can be extended further to provide dynamic zone-based capacity control as subscribers enter or leave a communication session, or as priority levels, thresholds or other criteria change.

An exemplary embodiment of the present invention has been described above. Those skilled in the art will understand, however, that changes and modifications may be made to this embodiment without departing from the true scope and spirit of the present invention, which is defined by the claims.

We claim:

1. A method of controlling capacity in a communication system, comprising:
   receiving a request to establish a communication session between a plurality of subscribers;
   making a determination that more than a threshold number of the subscribers are located in a common zone; and
   responsive to the determination, barring at least one of the subscribers located in the common zone from participating in the session.

2. The method of claim 1, wherein the threshold number of subscribers is T subscribers, and wherein making a determination that more than the threshold number of the subscribers are located in a common zone comprises:
   determining where each of the subscribers is located; and
   determining that N of the subscribers are located in the common zone, wherein N is more than T.

3. The method of claim 1, wherein the threshold number of subscribers is T subscribers, wherein the plurality of subscribers comprises N subscribers located in the common zone, and wherein barring at least one of the subscribers from participating in the session comprises barring T−N=X of the subscribers from participating in the session.

4. The method of claim 1, wherein the common zone is a zone selected from the group consisting of (i) a geographic area, (ii) a cell of a cellular communication system, (iii) a sector of a cell of a cellular communication system, (iv) a network, (v) a sub-network, and (vi) an enclosure.

5. The method of claim 1, wherein at least one of the subscribers is a mobile subscriber.

6. A method of controlling capacity in a communication system, comprising:
   receiving a request to establish a communication session between a plurality of subscribers;
   making a determination that X more than a threshold number of the subscribers are located in a common zone; and
   responsive to the determination, barring the X more subscribers from participating in the session.

7. A method of capacity control in a wireless communication system, the wireless communication system including a plurality of service areas for serving mobile subscribers, the method comprising:
   receiving a request to establish a communication session between a group of the mobile subscribers;
   making a determination that the group of mobile subscribers includes more than a threshold number of mobile subscribers operating in a given service area of the wireless communication system; and
   in response to the determination, excluding at least one of the mobile subscribers located in the given service area from participating in the communication session.

8. The method of claim 7, wherein receiving a request to establish a communication session between a group of mobile subscribers comprises:
   receiving a session initiation request from one of the mobile subscribers, the session initiation request identifying at least one other mobile subscriber with whom to establish the communication session.

9. The method of claim 7, wherein receiving a request to establish a communication session between a group of mobile subscribers comprises:
   receiving a group session initiation request from one of the mobile subscribers, the group session initiation request representing a request to establish the communication session between the group of mobile subscribers.

10. The method of claim 9, further comprising:
    determining which mobile subscribers are members of the group.

11. The method of claim 7, wherein making a determination that the group of mobile subscribers includes more than a threshold number of mobile subscribers operating in a given service area of the wireless communication system comprises:
    determining that a number of the mobile subscribers of the group are operating in the given service area; and
    determining that the number exceeds the threshold.

12. The method of claim 11, wherein determining that a number of the mobile subscribers of the group are operating in the given service area comprises:
    determining, respectively for each mobile subscriber of the group, in which service area the mobile subscriber is located.

13. The method of claim 12, wherein determining in which service area the mobile subscriber is located comprises:
    querying a location system, and receiving in response from the location system an indication of the service area in which the mobile subscriber is located.

14. The method of claim 11, wherein the threshold is specific to the service area, the method further comprising:
    determining the threshold for the service area, by reference to a data store.

15. The method of claim 7, further comprising:
    setting the threshold based on a measure of load in the service area.

16. The method of claim 7, wherein the wireless communication system comprises a cellular communication system, and wherein the service area is a geographic area selected from the group consisting of (i) a cell and (ii) a sector of a cell.

17. The method of claim 7, wherein the request to establish the communication session originates from an originating mobile subscriber, the method further comprising:
    informing the originating mobile subscriber that at least one mobile subscriber has been excluded from participating in the communication session.

18. The method of claim 17, wherein informing the originating mobile subscriber that at least one mobile subscriber has been excluded from participating in the communication session comprises:
    sending a message to the originating mobile subscriber, the message indicating that at least one mobile subscriber has been excluded from participating in the communication session.

19. The method of claim 18, wherein sending a message to the originating mobile subscriber comprises sending the message to the originating mobile subscriber via HTTP.

20. The method of claim 18, wherein the message identifies the at least one subscriber.

21. The method of claim 7, wherein each mobile subscriber has a respective priority level, the method further comprising:
selecting the at least one mobile subscriber based on the priority level of the at least one mobile subscriber.

22. The method of claim 21, wherein selecting the at least one mobile subscriber based on the priority level of the at least one mobile subscriber comprises:
comparing the priority levels of the mobile subscribers in the group and thereby identifying the at least one mobile subscriber as having at least one lower priority than at least one other mobile subscriber of the group.

23. The method of claim 7, wherein the request to establish the communication session originates from an originating mobile subscriber, the method further comprising:
receiving from the originating mobile subscriber an indication of the at least one mobile subscriber.

24. A method of controlling capacity in a cellular communication system, the cellular communication system defining a number of sectors, the method comprising:
allowing up to only a threshold number of mobile stations in a given sector to engage in a conference session with each other at any given time; and
barring more than that threshold number of mobile stations from participating in the conference session.

25. A system for controlling capacity in a communication system, the system comprising:
means for receiving a request to establish a communication session between a plurality of subscribers;
means for making a determination that more than a threshold number of the subscribers are located in a common location; and
means for barring at least one of the subscribers from participating in the session, in response to the determination.

26. A system for controlling capacity in a communication system, the system comprising:
at least one processor;
data storage holding threshold data and program instructions;
the threshold data indicating, for each of a plurality of service areas, a threshold number of subscribers that are allowed to engage in a communication session with each other in the service area;
the program instructions being executable by the at least one processor, in response to a request to establish a communication session among a group of subscribers, to:
reference the threshold data to determine the threshold number of subscribers that are allowed to engage in a communication session with each other in a given service area;
make a determination that the group of subscribers includes more than the threshold number of subscribers operating in the given service area; and
responsive to the determination, bar a sufficient number of the subscribers from participating in the session so that at most the threshold number of subscribers operating in the given service area participate in the session.

27. A service agent coupled with a packet-switched network, the service agent being programmed to receive a request to initiate a communication session among a group of subscribers and to responsively (i) make a determination that the group includes more than a threshold number of subscribers operating in a given service area and (ii) responsive to the determination, truncate the group to include at most the threshold number of subscribers operating in the given service area.

28. The service agent of claim 27, wherein the service agent comprises a SIP proxy server, the service agent receiving the request as a SIP INVITE request.

29. The service agent of claim 27, wherein the service agent receives the request from a given subscriber, the service agent being further programmed to send to the given subscriber a message indicating that the group has been truncated.

30. The service agent of claim 29, wherein the service agent sends the message to the given subscriber via HTTP.

31. The service agent of claim 27, wherein the service agent is programmed to refer to subscriber priority data to determine which subscriber(s) of the group to truncate from the group.

32. The service agent of claim 27, wherein the service agent receives the request from a given subscriber, the service agent further receiving from the given subscriber an indication of which subscriber(s) to truncate from the group.

* * * * *